(No Model.)
J. B. WEBB.
DYNAMOMETER.
No. 490,381. Patented Jan. 24, 1893.
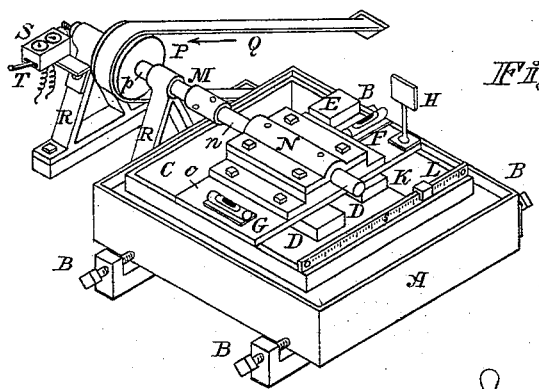
Fig. 1.
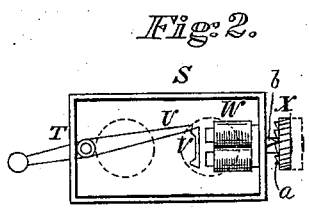
Fig. 2.
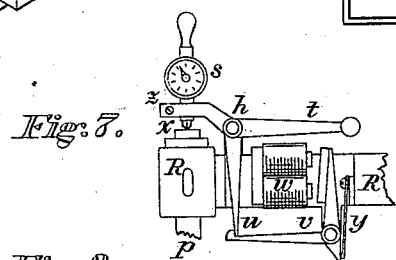
Fig. 7.
Fig. 4. Fig. 3.
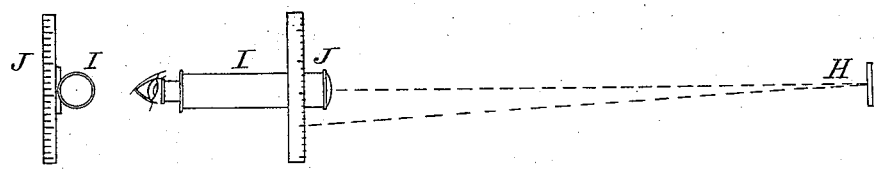
Fig. 5.
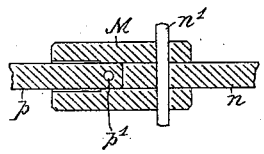
Fig. 6.
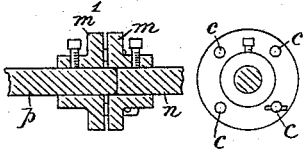
Witnesses;
A. S. Kinsey
J. E. Denton
Inventor;
J Burkitt Webb

UNITED STATES PATENT OFFICE.

JOHN BURKITT WEBB, OF MILLBURN, NEW JERSEY.

DYNAMOMETER.

SPECIFICATION forming part of Letters Patent No. 490,381, dated January 24, 1893.

Application filed February 4, 1891. Serial No. 380,253. (No model.)

*To all whom it may concern:*

Be it known that I, JOHN BURKITT WEBB, a citizen of the United States, residing near Millburn, in the county of Essex and State of New Jersey, (business address, Hoboken, New Jersey,) have invented a new and useful Dynamometer, of which the following is a specification.

My invention relates to improvements in dynamometers used to measure the foot pounds absorbed or given out by a rotating machine, said foot pounds being equal to the product of twice the number of revolutions per minute multiplied by 3.1416 and by the statical moment causing, or caused by the revolution of the machine; the object of my improvement being to make a dynamometer of simpler construction, greater accuracy and precision and more easily adjusted and used than other dynamometers.

Figure 1 is a parallel perspective view of the apparatus, arranged for testing the viscosity of lubricating oils, and consisting of the dynamometer itself, with a journal box and shaft mounted upon it driven by a belt to its countershaft and lubricated with the oil to be tested. Fig. 2 is a view of the dynamometer-counter S seen from below and showing the special device for stopping and starting it. Fig. 3 shows in elevation the mirror H in connection with a telescope and scale, I and J, for detecting slight deviations of the mirror from the vertical plane. Fig. 4 shows the telescope and scale in side elevation. Figs. 5 and 6 are coupling details. Fig. 7 shows the device for throwing any ordinary counter in and out of gear with the dynamometer.

The dynamometer consists fundamentally of the "caisson" C floating in the "tank" A and furnished with apparatus to maintain it in a level position or note its deviation therefrom and with a counter-shaft and revolution counter to drive (or be driven by) the machine to be tested and count its revolutions.

The tank A rests upon skids (preferably) so that by means of the screws B B B B, in the ends of the skids, it can be adjusted until the caisson floats in the middle of the tank sidewise, the caisson being held in position by the countershaft. The tank may have water connections with cocks for supplying and removing the water, but for moderately sized tanks this is not necessary and the extra length of the tank at the end A is designed partly to give room between it and the caisson for dipping out water if too much has been put in.

The machine to be tested,—which in the case shown is a simple journal box, N, having a shaft n running loosely therein and lubricated with the oil whose viscosity is to be ascertained,—is mounted upon the caisson, either upon the shelf o shown across its top, or, by removal of the shelf, upon the bottom of the caisson. The machine can thus be placed at a suitable height to balance properly in the caisson, the counter shaft hangers, R, R, being also raised or lowered if necessary by changing the blocking beneath them or by the screws for that purpose with which hangers are generally furnished.

P is the pulley and Q the belt for transmitting the power to or from the machine, as the case may be.

M is a coupling made somewhat loose on the counter shaft p so as to act substantially as a ball or universal joint within a slight angle, i. e. the coupling compels the shafts to rotate together but allows them to make a slight angle with each other if they want to, as will be further explained.

The test shaft is supposed to be turned a little smaller where it goes through the journal box N, so that it needs no collars to keep it in place; this understood it will be seen that, as the countershaft is supposed to be kept in position by collars (not shown), the caisson, being fast to it, must also be fixed in position. By removing one of the pins of the coupling the caisson can be floated toward the end A of the tank, so as to be free of the counter shaft and capable of being accurately balanced and adjusted to the proper degree of sensitiveness.

The machine N is supposed to be mounted about central and at such a height as to give about the right sensitiveness, in fact we may suppose that were the machine a quarter inch higher the "float" would be top-heavy and would tip over to one side rather than remain level. "Float" is the term chosen to designate the caisson with the machine upon it, as also with all the other weights and apparatus attached to and supported by it. With the machine thus approximately in position it is easy to bring the float exactly level by shifting the weights D, D, &c. on the floor of the caisson, while at the same time the center of gravity of the float may be still further raised a little by lifting any weight from the floor of the caisson up on to the shelf, as shown at E. When the machine is very light in comparison to the capacity of the caisson it is sometimes necessary to mount a shelf upon the caisson above the machine, so that a greater height from the floor of the caisson to this shelf will be available, or simple uprights may be fastened to the sides of the caisson with means of fastening weights near their upper ends. In this way the center of gravity may be made sufficiently high without the necessity of setting the light machine abnormally high.

The levels F and G show when the caisson is level and by shifting the sliding weight K upon the scale L the sensitiveness can be noted, which should be such that an inch movement of the bubble in F should be caused by a movement of K of from a half inch to one inch; if more movement of K is required then more weight should be raised to the shelf to increase the sensitiveness. When the caisson is leveled the sliding weight should be near one end of the scale—near the zero end if the machine absorbs power and the belt runs as the arrow indicates the quantity of water should also be such as to bring the machine up to the height of the counter shaft. The caisson must however not be floated too high from the bottom of the tank, and, in fact, it is better to have only a quarter of an inch of water beneath it, so that this thin sheet of water may act as a dash pot to increase the steadiness of the apparatus. If the space is too great it may be partly filled with sand nearly touching the bottom of the caisson. Ordinary work, however, does not require this increased steadiness.

H is a mirror fast to the caisson and used in connection with a simple telescope and scale set up on the left of the caisson and a few feet away from it. This is the well known arrangement for observing any change of angular position in the mirror and Figs. 3 and 4 serve to explain it. If by a tipping of the caisson the mirror is thrown out of the vertical position, then an observer at the telescope I, who has previously adjusted the same so that the center of the scale J coincided with the cross hairs in the telescope, will see the scale apparently move until some other point is upon the cross hairs. In Fig. 3 the fifth division below the center of the scale is shown with a broken line representing the ray of light from it to the tipped mirror and back again into the telescope. The level of the caisson can thus be observed either by watching the level F or by means of the telescope, scale and mirror, H, J, I, or both means can be employed at the same time.

When a machine is mounted upon the caisson a level should be placed upon its shaft and compared with level G and if their indications do not agree the machine should be wedged up until they do; to avoid the trouble of doing this the machine is simply mounted with parallel blocks between it and the bottom of the caisson and the level G is then adjusted (by screws, not shown) until its indications agree with those of the level on the shaft. The machine being then mounted and the right degree of sensitiveness secured the caisson will float level and if disturbed will return slowly to the level position with little tendency to oscillate about it, owing to the dampening action of the water beneath the caisson. It is then ready to be coupled to the countershaft for an experiment, before doing which, however the reading on the scale must be taken with the weight K (which has been accurately weighed) carefully adjusted to bring the bubble of the level F to its middle position. When the shafts have been coupled the level G should be again observed and if it has been thrown out of level by the coupling, the amount of water in the tank must be altered a little to make the caisson level again that is to say, the water in the tank should be just sufficient so that as the caisson floats, the two shafts shall be as nearly as possible on the same level and the end of the shaft borne by the caisson shall not require to be either raised or lowered to make the connection.

Owing to the extreme sensitiveness and accuracy of the apparatus the error due to the use of an ordinary counter applied by hand is too large to be admissible. Fig. 2 shows, then, a device, applicable to any design, almost, of counter, which reduces the error sufficiently. In attaching or applying or throwing into gear by hand any ordinary counter the instant when it commences (as also finishes, when thrown out again) to count cannot be accurately observed, therefore in the figures, T, the handle or piece by which the counter is thrown into gear, is furnished with a tail U which engages with the armature V of the electro-magnet W and this armature is automatically moved at regular intervals (of a quarter, half or one minute, say) by connecting the magnet with a clock. The pressure to throw the counter in or out of gear being then supplied to the handle in advance by the hand the armature prevents the motion until the definite interval (or a number of them) has expired when it is withdrawn and the handle operates.

Just how the handle operates to effect the connection of the counter with the countershaft is of no importance; for illustration we have shown a worm gear X on the end of the counter and suppose the shifting of the handle to move this endwise (into the dotted position) so as to make it engage with a worm on the end of the counter-shaft. Fig. 2 shows also a ratchet *a* formed on the inner side of the worm gear the object of which is to check the motion of the counter as soon as its connection with the counter-shaft is broken; to this end a tooth *b* is shown projecting from the box or case of the counter, which engages and checks the ratchet when, by shifting the handle, it is drawn back, and thus stops the counter.

My device for throwing the revolution counter in and out of gear at different intervals is substantially a part of the dynamometer and has nothing to do with the counter proper further than that it may, to secure compactness, be embodied therein, as shown in Fig. 2. It may therefore be made so that an ordinary "speed counter" can be used, as shown in Fig. 7, where the small letters *s*, *t*, *u*, *v*, *w*, *x* indicate parts corresponding with those marked with the same large letters in Fig. 2.

R is the back counter-shaft hanger, to which the frame of the device is fastened, and *p* is the end of the counter-shaft. The speed-counter *s* has a squared end *x* which engages in a countersink in the end of the shaft, when the counter is thrown into gear. The piece *t* by which the counter is thrown into gear is here a three armed lever pivoted upon the frame at *h*. One arm *z* terminates in a screw clamp (or other suitable device) by which the counter is firmly held; the arm *t* carries the handle and the arm or tail *u* engages with the locking device. The locking piece *v* has also three arms; one of them locks the tail *u* when the counter is either in gear or out, a second carries the armature of the electro-magnet *w*, while the third is much shorter and is acted upon by the spring *y* to keep the lock shut except when opened by the magnet at the proper times. Instead of a clock operating through a magnet the clock may be made to unlock the device mechanically.

Having thus described the construction of the apparatus its use is as follows; It being required to find the power absorbed or given out by any machine whatever capable of being conveniently mounted upon the caisson and capable of operating, or being operated by, the countershaft, we first determine whether the caisson will float the machine. The machine may be an oil-testing machine, a steam-engine, a gas-engine, an electric motor or dynamo or any other machine answering to the above conditions. If the weight of the machine plus that of the caisson and its attachments is not more than the weight of the water displaced by the caisson when sunk to its greatest depth, the caisson will float the machine. If the machine is a small one we have the choice of adding weights to sink the caisson to its maximum depth or of using less water and sinking it less, but so as to bring its bottom near the bottom of the tank. We now mount the machine and make it fast, taking care to have its shaft high enough to pass over the edge of the caisson and the center of gravity of the whole float not far below the meta-center, or, in other words, to have the float nearly top-heavy. We then adjust it to the correct level and sensitiveness and couple the shaft to the counter-shaft. Then by the screws B bring the tank into a central position to suit the counter-shaft, which has been set so that the belt is properly tight and runs nicely. Then start the machine. If a dynamo is on the caisson the connecting wires must hang loosely so that they do not affect its action, and if a steam or other engine connected by pipes is upon it, these pipes must be long and flexible so as not to affect the slight motion which the caisson has. When the machine is running the torque or moment in the shaft will cause the caisson to tip out of level and K must be shifted to bring it back to a level position, while at the same time the counter must be in operation to give the number of revolutions. Then the distance which K has been moved is found by subtracting the reading before connecting with the counter-shaft from that just made, and this distance multiplied by the weight of K is the torque, or moment. Multiply this moment by the number of revolutions per minute and by twice 3.1416 and the foot pounds is obtained, it being supposed that the scale is graduated to feet and decimals of a foot and the weight given in pounds and decimals thereof.

Figs. 5 and 6 are added to explain the action of the coupling. A perfectly rigid coupling would operate just as well as those shown provided the counter-shaft journals and those of the machine on the caisson were exactly in line. That is to say; there is no objection to the counter shaft and machine shaft being, or constituting, one solid shaft, with no joint where the coupling is, except the trouble of making it perfectly straight and the inconvenience of being unable to disconnect the machine from the counter-shaft. Besides which objections if the apparatus were to stand unused until the water evaporated the weight of the float might bend the shaft or otherwise injure the apparatus.

The coupling represented in Fig. 1 is shown in section in Fig. 5 with the looseness greatly exaggerated. I prefer a plate coupling, such as is shown in Fig. 6, though almost any means of connecting the shafts, which does not actually hold them out of line with each other, answers very well. I think, however, that the plate coupling runs with less vibration than others.

The coupling, Fig. 5, is put on the shaft *n* of the machine tight and at one point fits the counter-shaft *p* while the rest of the way it is a hundredth of an inch loose, say. This keeps the ends of the shafts true with each other but allows a slight angle between them when necessary. The coupling is secured to the two shafts respectively by the pins $n'$ and $p'$.

In the plate coupling, Fig. 6, one shaft $p$ enters the opposite plate $m$ just enough to center the shaft and the plates $m$, $m'$ are drilled with several holes, into which pins $c$ are driven fitting tight in one plate but loose in the other. The plates are put on the shafts so that their ends come together before the plates quite meet and a key is put through one of the pins just to prevent the thing floating apart. When the machine is running the pins cause one plate to drive the other and the friction of the pins in the holes of the plate causes the caisson to assume a position such that the shafts are in line with each other sidewise, they having been brought to the same level by adjusting the quantity of water in the tank. The counter-shaft is, of course, set up level. This action of the friction is a very convenient and beautiful one and may not at first be evident. When the shafts are in line the pins do not slide in their holes, but if the caisson floats out of position, on account of some disturbing force acting to make it, the pins must commence rubbing in the holes and this friction acts always to bring the shafts back into line.

The apparatus might also be employed simply to measure the torsion in a rod as evidently if one end of a rod were fastened to it and the other end twisted the caisson would be tipped out of level and the weight K, which might be a very heavy weight, could be shifted to level it again. I anticipate, however, that its use will be mostly, if not entirely, for dynamical, and not statical, measurements. Of course any other liquid could be used to float the caisson, but water is the most convenient even if it is not as heavy as some other liquids.

I use the word caisson in the following claims in the broad sense to include as equivalents any floating body adapted for the duty assigned to it.

What I claim in this apparatus and desire to secure by Letters Patent is:

1. In a dynamometer, in combination, a liquid containing receptacle, a caisson adapted to be supported upon the liquid contained therein, a power absorbing, generating or transmitting mechanism mounted upon said caisson adapted to be connected with mechanism supported independently of said caisson, substantially as described.

2. In a dynamometer, in combination, a liquid containing receptacle, a caisson adapted to be supported upon the liquid contained therein, rotary mechanism mounted upon the caisson, other rotary mechanism mounted upon other supports and a power transmitting connection interposed between said two mechanisms, substantially as described, whereby the tendency of the caisson to careen measures the energy transmitted.

3. In a dynamometer in combination, a liquid containing receptacle, a caisson adapted to be supported upon the liquid contained therein, a power absorbing, generating or transmitting mechanism mounted on said caisson adapted to be connected with mechanism supported independently of said caisson and means for noting the deviation of said caisson under the influence of the energy transmitted, substantially as described.

4. In a dynamometer, in combination, a liquid containing receptacle, a caisson adapted to be supported upon the liquid contained therein, a power absorbing, generating or transmitting mechanism mounted on said caisson adapted to be connected with mechanism supported independently of said caisson and means whereby said caisson may be leveled, substantially as described.

5. In a dynamometer, in combination, a liquid containing receptacle, a caisson adapted to be supported upon the liquid contained therein, a power absorbing, generating or transmitting mechanism mounted on said caisson adapted to be connected with mechanism supported independently of said caisson and a semi-loose or flexible coupling, whereby said connection may be made, substantially as described.

6. In a dynamometer, in combination, a liquid containing receptacle, a caisson adapted to be supported upon the liquid contained therein, a power absorbing, generating or transmitting mechanism mounted on said caisson adapted to be connected with mechanism supported independently of said caisson and an elevated support on said caisson adapted to receive a weight whereby the height of the center of gravity may be regulated, substantially as described.

7. In combination, a liquid containing receptacle, a caisson adapted to be supported upon the liquid contained therein, a power absorbing, generating or transmitting mechanism mounted upon said caisson adapted to be connected with mechanism supported independently of said caisson, and mechanism adapted to support a counter and determine the length of time that it is in operation, substantially as described.

JOHN BURKITT WEBB.

Witnesses:
J. E. DENTON,
D. S. JACOBUS.